(12) United States Patent
Chandy et al.

(10) Patent No.: US 6,389,338 B1
(45) Date of Patent: May 14, 2002

(54) ROBUST FAULT DETECTION METHOD

(75) Inventors: Ashok Chandy, Fenton; Mark Philip Colosky, Vassar; Mark Dennis Kushion, Saginaw, all of MI (US)

(73) Assignee: Delphi Technologies, Inc., Troy, MI (US)

(*) Notice: Subject to any disclaimer, the term of this patent is extended or adjusted under 35 U.S.C. 154(b) by 0 days.

(21) Appl. No.: 09/634,439

(22) Filed: Aug. 8, 2000

(51) Int. Cl.[7] .............................. G06F 19/00; B62D 5/04
(52) U.S. Cl. ............................................. 701/29; 701/41
(58) Field of Search ............................. 701/29, 34, 41; 180/443, 402

(56) References Cited

U.S. PATENT DOCUMENTS

| | | | |
|---|---|---|---|
| 5,636,137 A | * 6/1997 | Hazelden | 364/507.444 |
| 5,811,695 A | * 9/1998 | Satoh et al. | 73/862.331 |
| 5,920,174 A | * 7/1999 | Kawada et al. | 318/663 |
| 6,272,430 B1 | 8/2001 | Krasner | 701/207 |

* cited by examiner

Primary Examiner—Michael J. Zanelli
(74) Attorney, Agent, or Firm—Edmund P. Anderson

(57) ABSTRACT

A system and method of discriminating faults in an error signal, such as that from a control input sensor, comprises a system for and method of determining allowable limits of an error signal versus time, passing the error signal through a low-pass filter, comparing output of the low-pass filter with a threshold and outputting a fault condition when the output of the low-pass filter exceeds the threshold. The time constant or constants of the low-pass filter and the threshold are selected so that a fault condition is detected when the error signal approaches the allowable limits before exceeding them.

22 Claims, 6 Drawing Sheets

ROBUST FAULT DETECTION METHOD

BACKGROUND OF THE INVENTION

This invention relates to a robust fault detection method applicable to electronic steering systems for automobiles.

Steering equipment for assisting a driver to steer an automobile is well known in the art. In conventional steering assemblies, the operator controls the direction of the vehicle with the aid of a steering wheel. This wheel is mechanically connected, usually through a gear assembly to the road wheels. To aid the operator, many systems utilize an auxiliary system to generate a force that is transmitted to a steering gear assembly. The additional force reduces the effort required by the operator in changing the direction of the vehicle. Typically, this auxiliary force is generated by either a hydraulic drive or an electric motor.

Control systems are known that provides a vehicle operator with an electric steering assist or electronic steering (or "steer-by-wire") control for a vehicle. In an electric steering assist system, a control input is measured by a control input sensor, e.g., torque sensor. The output of the control input sensor is input into a control unit, which then drives a motor for assisting the driver in turning the steering column and thus turning the front wheels. It has been known to use sensors having a diagnostic output that provides an error signal for purposes of determining whether a sensor failure or fault condition exists. However, prior to the present invention, the control system has not been capable of determining whether a fault condition exists without occasionally generating false-positives. As will be made more clear, the approach taken by the prior art necessarily generated false positives in order to avoid false negatives.

The steer-by-wire control system comprises a steering wheel unit, a control unit, and a steering motor drive that operate together to provide steering control for the vehicle operator. The steering motor drive includes an electric motor for each road wheel steering mechanism and has several sensors including road wheel position sensors and steering wheel sensors. For the same reason mentioned above with respect to an electric steering assist system, the control system has not been capable of determining whether a fault condition exists in these control input sensors without generating false positives.

It would be desirable to provide a system that can accurately distinguish a fault condition from an ordinary transient control output without generating false positives.

SUMMARY OF THE INVENTION

The above-discussed and other drawbacks and deficiencies of the prior art are overcome or alleviated by providing electronic steer-by-wire and electric steering assist systems with a robust fault detection scheme to determine if a control input sensor in the steering system is faulty. To determine the tolerable error, an error signal is applied at varying levels to determine how long the error can exist without violating pre-established system or vehicle deviation threshold. This testing results in a number of data points of error versus time which can be graphed and which will form a requirements curve.

Once the requirements curve is known, a time-constant and threshold are selected for a low-pass filter and comparator, respectively. The error signal is passed through the low-pass filter and comparator so that the fault discrimination curve approximates the requirements curve without exceeding it.

The above-discussed and other features and advantages will be appreciated and understood by those skilled in the art from the following detailed description and drawings.

BRIEF DESCRIPTION OF THE DRAWINGS

Referring now to the exemplary drawings wherein like elements are numbered alike in the several FIGURES.

DETAILED DESCRIPTION OF THE PREFERRED EMBODIMENTS

Figure 1:
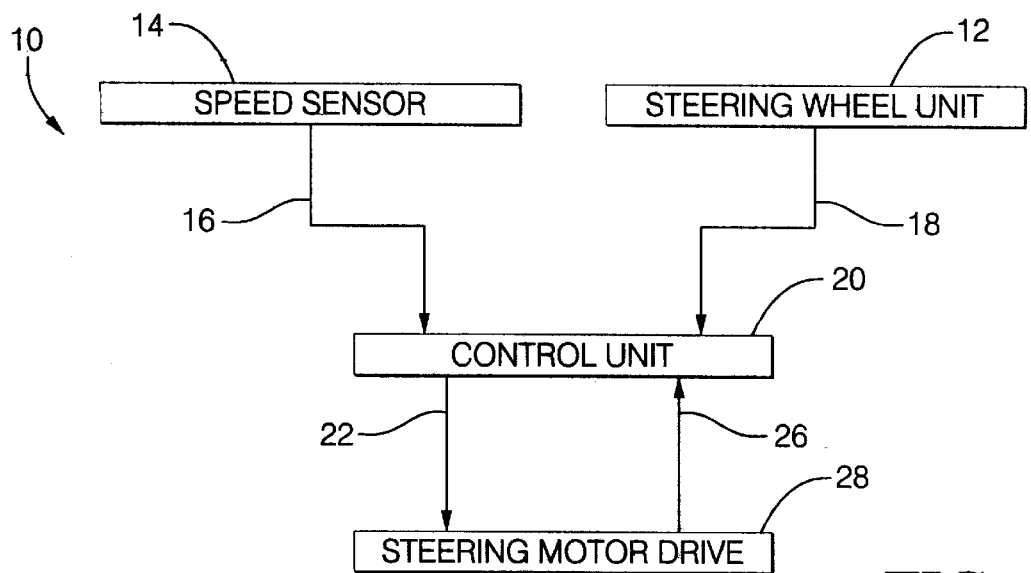
FIG. 1 shows a schematic overview of a steering control system.
Figure 2:
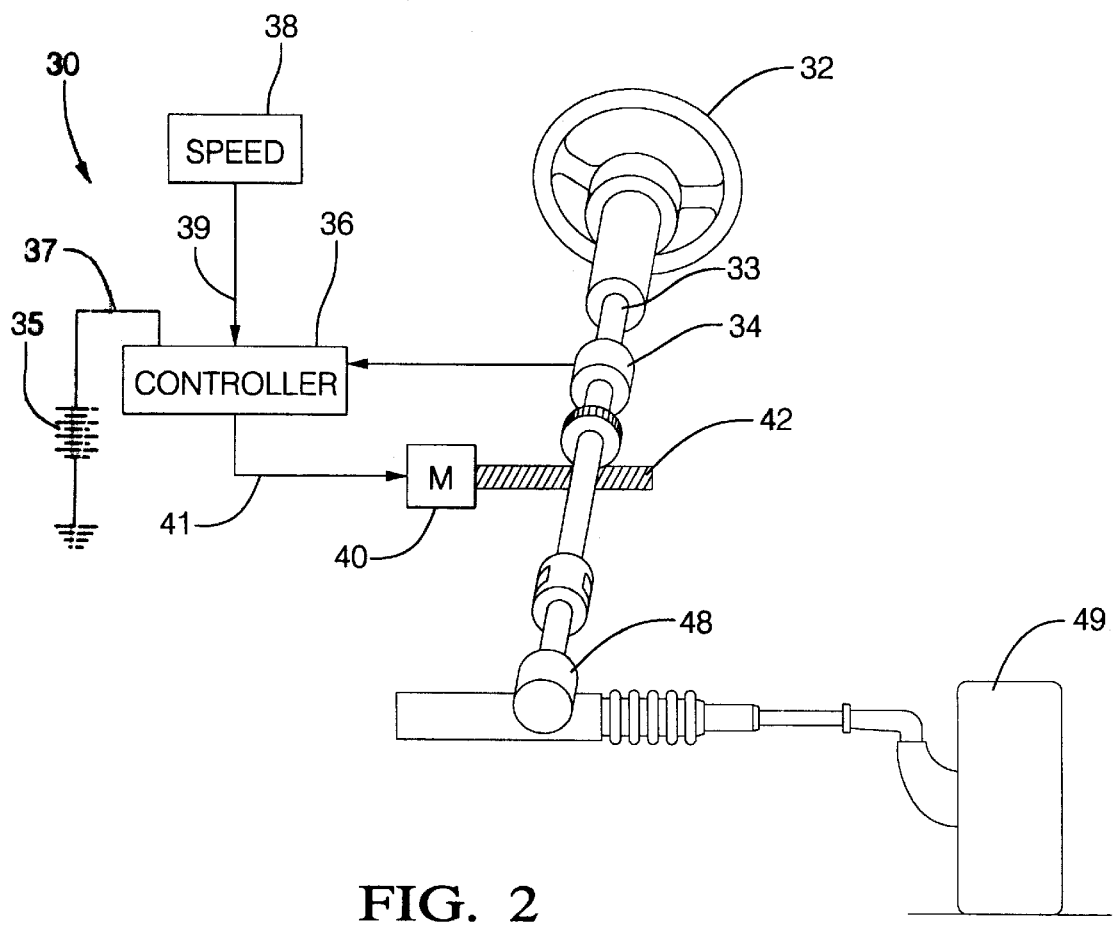
FIG. 2 shows a schematic diagram of a electric power steering system.

An exemplary system for detecting faults in a steer-by-wire control system 10 is shown in FIG. 1 and an exemplary electric steering assist system is shown in FIG. 2. The steer-by-wire control system 10 includes a steering wheel unit 12 that accepts input from a steering wheel (not shown) or other input means from a driver or operator of the vehicle. The steering wheel unit determines the angle of the steering wheel or desired steering angle and provides this information via data signal 18 to control unit 20. Control unit 20 accepts the steering wheel position data signal 18 along with other sensor inputs such as speed signal 16 from vehicle speed sensor 14.

These inputs are used to determine a desired steering position for each wheel having steering capability (not shown).

The desired steering position for each wheel is compared with the actual steering position for each wheel, which is determined from feedback signal 26 containing the steering position for each wheel having steering capability. Steering torque or strain on the control rod may be measured to provide feedback to the driver. Control unit 20 calculates or otherwise determines (e.g., via a look-up table) a new position for steering motor based on the actual steering position for each wheel. The new output for each steering motor is sent to steering motor drive 28. Note that there may be a single steering motor drive as shown in FIG. 1 for a four-wheel vehicle wherein the left and right wheels turn in unison, or multiple steering motor drives—one for each wheel having steering capability. For example, each front wheel may have an independent steering motor drive and each back wheel may also have a steering motor drive. For vehicles having more than 2 axles, each wheel may be independently controlled for maximum control and reduced wear on the tires.

FIG. 2 shows a schematic diagram of an electric steering assist system 30. In this system, steering wheel 32 is mechanically connected to steering mechanism 48 which rotates front wheels 49 (only one shown). To assist the driver, steering wheel position and torque sensor 34 senses torque applied to steering column 33 by a driver and detects the angle of steering wheel 32. The torque and angle information are provided to controller 36. Speed sensor 38 also provides vehicle speed information to controller 36 via signal 39. Controller 36 is powered by battery 35 and power line 37. Controller 36 provides a drive voltage to motor 40 via line 41. Motor 40 in turn applies a torque to output shaft 42, thereby reducing the share of torque against steering mechanism 48 applied by a driver or operator at steering wheel 32.

Electronic steering systems 10 and 30 both generate control input signals which are sent to a control unit that produces output for rotating, or assist in rotating, wheels having steering capability. In the case of a faulty control input sensor, the control unit will be operating with faulty inputs and a danger exists of generating faulty output. The control system disclosed herein allows for such a steering system to accurately distinguish between normal and abnormal operation of control input sensors. Although the description that follows is directed to torque sensors by way of example, the system described can be used to discriminate between normal and faulty operation using error signals from other control input sensors, as well as error signals in general. For example, the system may be applied to internal error signals generated within a control system.

Torque sensors are available that generate two separate signals. A first torque signal $T_1$ is a voltage signal, e.g., from 0 to 5 volts and a second torque signal $T_2$ is a voltage signal from, e.g., 5 to 0 volts. Adding the two signals together should always equal 5 volts ($T_1+T_2=5$). The actual torque is obtained by subtracting $T_2$ from $T_1$ ($T_2-T_1$ input sensors that directly generate digital outputs, including a diagnostic error signal output are also available. The fault detection method described herein is applicable to either type of control input sensor.

Figure 3:
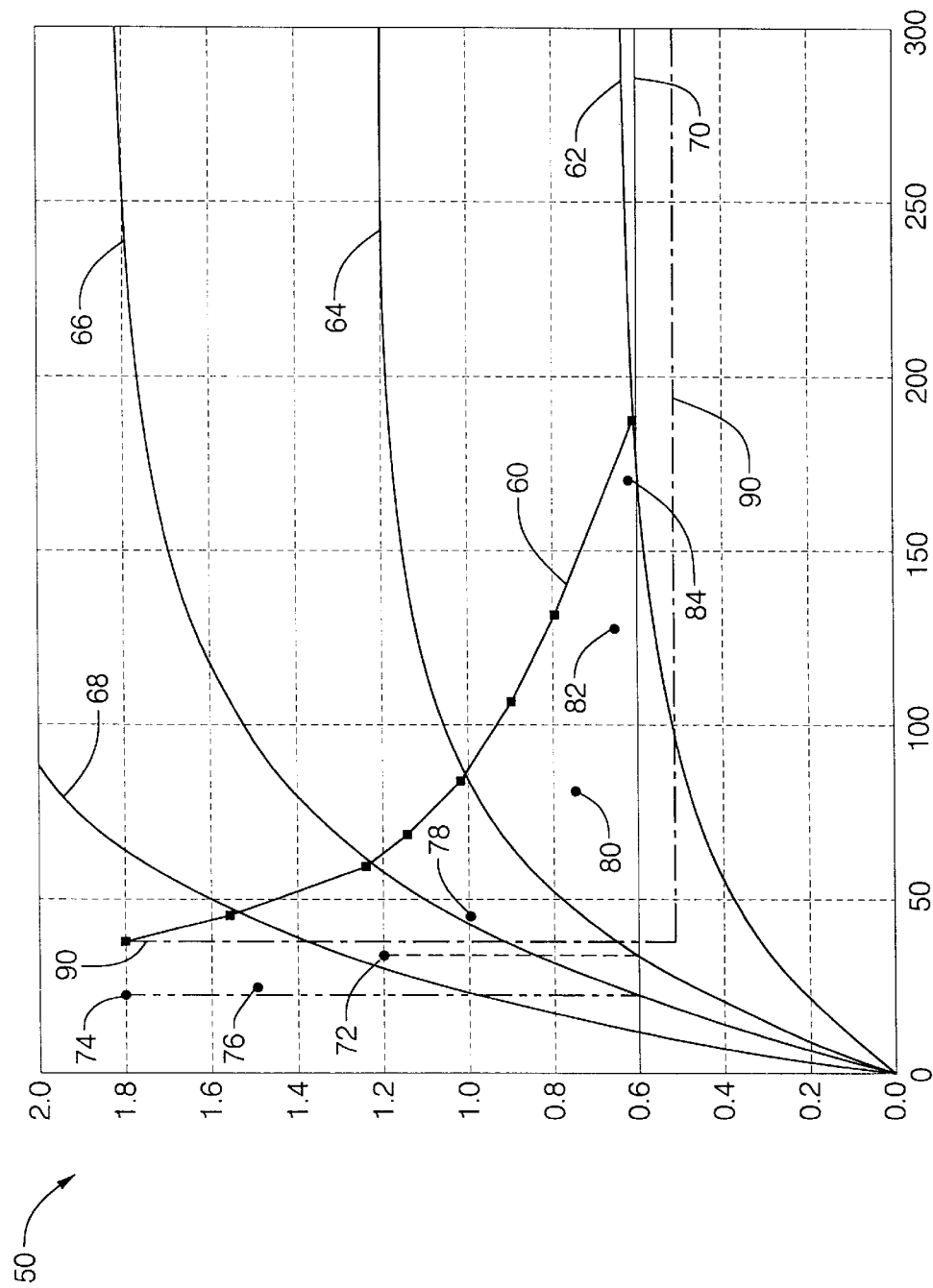
FIG. 3 shows a control input error versus time graph depicting a fault detection strategy.

FIG. 3 shows a graph 50 in which the vertical axis represents torque error signal in volts and the horizontal axis represents time in milliseconds. Requirements curve 60 is plotted connecting points representing the maximum safe or allowable time that a given amount of torque error can be tolerated based on the steering system characteristics. These points are determined empirically by direct observation, by extrapolation of such empirical studies, by a computer or mathematical modeling of a real-world steering system, or some combination thereof. For example, to empirically determine data points in the requirements curve, specific error amounts are applied to a control input, and the system is monitored to see how long such error amounts can be tolerated before they violate pre-established system or vehicle deviation thresholds.

When approximated by requirements curve 60, the test or analysis results represent a requirement that the torque output remain below and left of the requirements curve 60 for any given interval of time. If a torque error signal can be plotted above requirements curve 60, then the torque sensor is faulty.

One way of determining whether a fault condition exists is to test whether the torque error signal exceeds a threshold value for a given amount of time. Boundary 90 represents an example of this strategy. For any point above and to the right of boundary 90, a fault condition is determined, while if the point is below or to the left of boundary 90, then it is assumed that no fault condition exists. The use of a threshold value suffers from the drawback that a large percentage of possible good error signal-time values are excluded from boundary 90 and would erroneously be judged a fault condition. For example, point 80 which represents a sensor voltage signal of about 0.75 volts for approximately 80 milliseconds, is well on the safe side of requirements curve 60, but outside boundary 90 and therefore would erroneously be considered a fault condition. It would be desirable to improve this result by finding a simple way of distinguishing fault conditions that closely approach requirements curve 60, thereby avoiding false-positives for faults.

Figure 4:
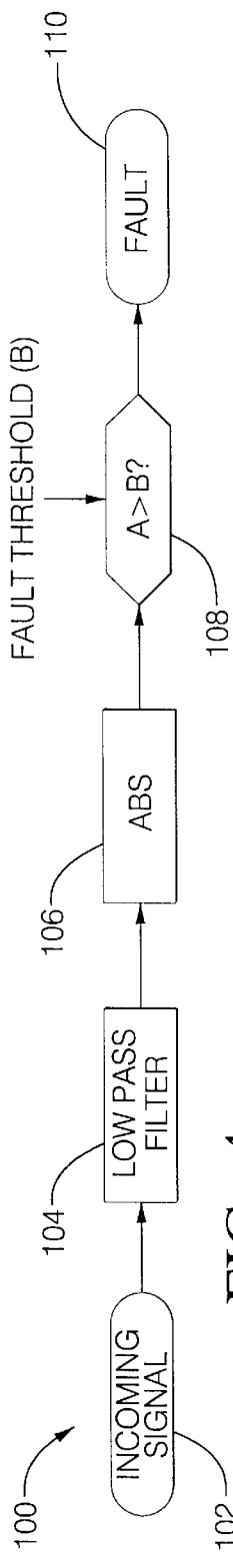
FIG. 4 shows a fault detection process diagram of a first exemplary embodiment.

Referring to FIG. 4, an exemplary embodiment is shown in the form of a process diagram 100 comprising a low-pass filter 104 to modify incoming torque error signal 102. The signal output from low-pass filter 104 is converted to a positive value using absolute value function 106. Then it is compared with a fault threshold value in comparator 108. If the filtered value exceeds the threshold value, then a fault signal is generated at 110.

The usefulness of this method is best seen by the example shown in FIG. 3. In this example, a time constant of 0.05 is applied to incoming torque signal voltages. A first curve 62 represents an input voltage of 620 millivolts. Curve 64 represents the input of 1.2 volts, curve 66 represents an input of 1.8 volts and curve 68 represents an input of 4 volts. Looking by way of example to curves 64 and 66, it can be seen that they pass a threshold of 600 millivolts at about 25 and 35 milliseconds, respectively. This shows that an input voltage of 1.2 volts and 1.8 volts registers a fault at 25 and 35 milliseconds, respectively, and so these points are plotted at 74 and 72. Remaining points 76, 78, 80, 82, and 84 are similarly generated, though the curves for each of the represented inputs are not shown. As can be clearly seen, points 74, 76, 78, 80, 82, and 84 are significantly closer to requirements curve 60 than is threshold boundary 90.

In the above example, low-pass filter 104 is a first-order filter. To even more closely approximate requirements curve 60, low-pass filter 104 may be a higher-order low-pass filters (having more than one time constant). Such a higher-order low-pass filter may in fact be multiple cascaded first-order low-pass filters, as is generally known in the art.

Figure 5:
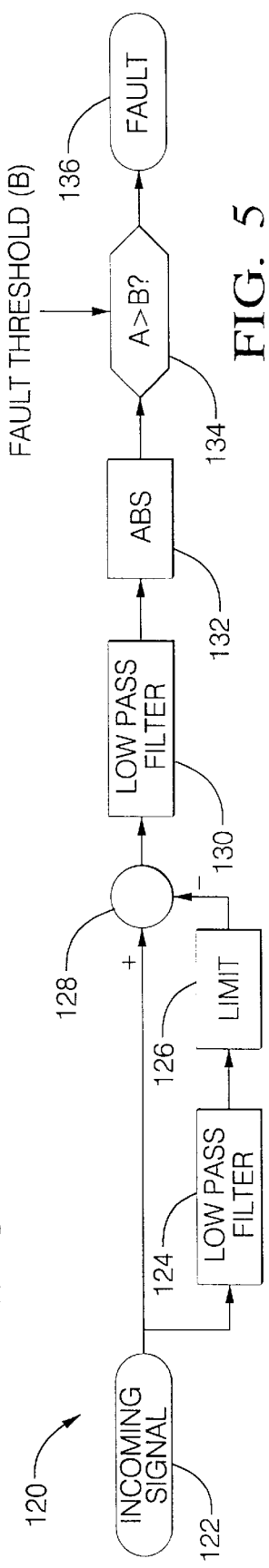
FIG. 5 shows the fault detection process diagram of FIG. 4 with a bias correction filter.

FIG. 5 shows a process diagram 120 similar to 100 in FIG. 4, but with the addition of a error signal bias correction function. Incoming error signal 122 is passed to a long-time low-pass filter 124. Output from long-time low-pass filter 124 should approximate a bias of the torque error signal. This value is passed to limit function 126 so that a fault will be detected if the bias is too great. Output from limit function 126 is subtracted from the original incoming error signal 122, resulting in a bias-compensated torque error signal, which is then passed to low-pass filter 130, absolute value function 132, comparator 134 as described above with respect to process diagram 100 above. If comparator 134 finds that the absolute value of the output of low-pass filter 130 is above a predetermined threshold, then a fault is determined.

Figure 6:
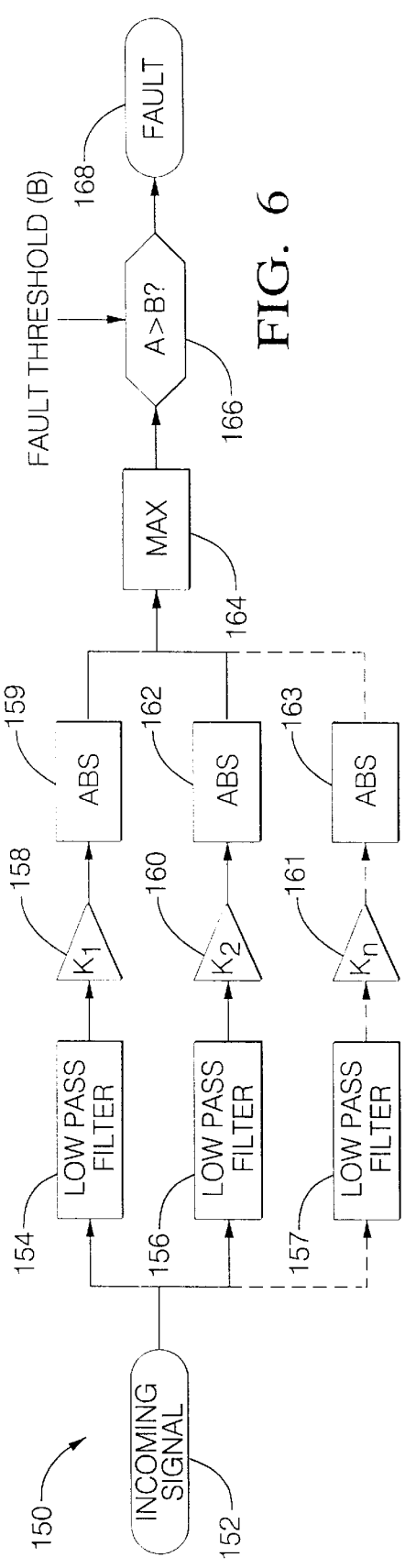
FIG. 6 shows a fault detection process diagram of a second exemplary embodiment.

A single low-pass filter 130 may be replaced with multiple low-pass filters having different time constants and multipliers may be employed with a maximum function to produce more complex voltage-time fault lines. An example of this technique is shown by process diagram 150 in FIG. 6 where an incoming signal 152 is directed to multiple low-pass filters 154, 156. These are directed through gain multipliers 158, 160 and the output thereof is directed to absolute functions 159, 162 and then to maximum function 164. Any number of filter-multiplier combinations are contemplated, as suggested in FIG. 5 by dashed lines leading to $n^{th}$ low-pass filter 157, $n^{th}$ multiplier 161, and $n^{th}$ absolute function 163. It should be understood that the multiplication constants for the gain multipliers may be normalized so that one of the multipliers, e.g., $K_1$, has a multiplication constant of 1 or may be removed entirely. The output of maximum function 164 is the greatest of the two inputs from multipliers 158, 160. This value is passed to comparator 166 which compares the signal to a fault threshold. If the signal is greater than the threshold value, then fault 168 is generated. Each low-pass filter 154, 156 has a distinct time constant and each multiplier 158, 160 has a distinct multiplication constant $K_x$. Therefore, the filter and multiplier combination having the maximum value will vary depending on the strength and interval of the incoming signal. Additionally, the incoming signal may be sinusoidal in nature, so that it is possible that a low-pass filter having a slower time constant will exceed a low-pass filter having a faster time constant. While process diagram 150 does not include a bias compensation routine as provided by low-pass filter 124 in FIG. 5, it is contemplated that one could advantageously be provided prior to low-pass filters 154, 156, and 157.

Figure 7:
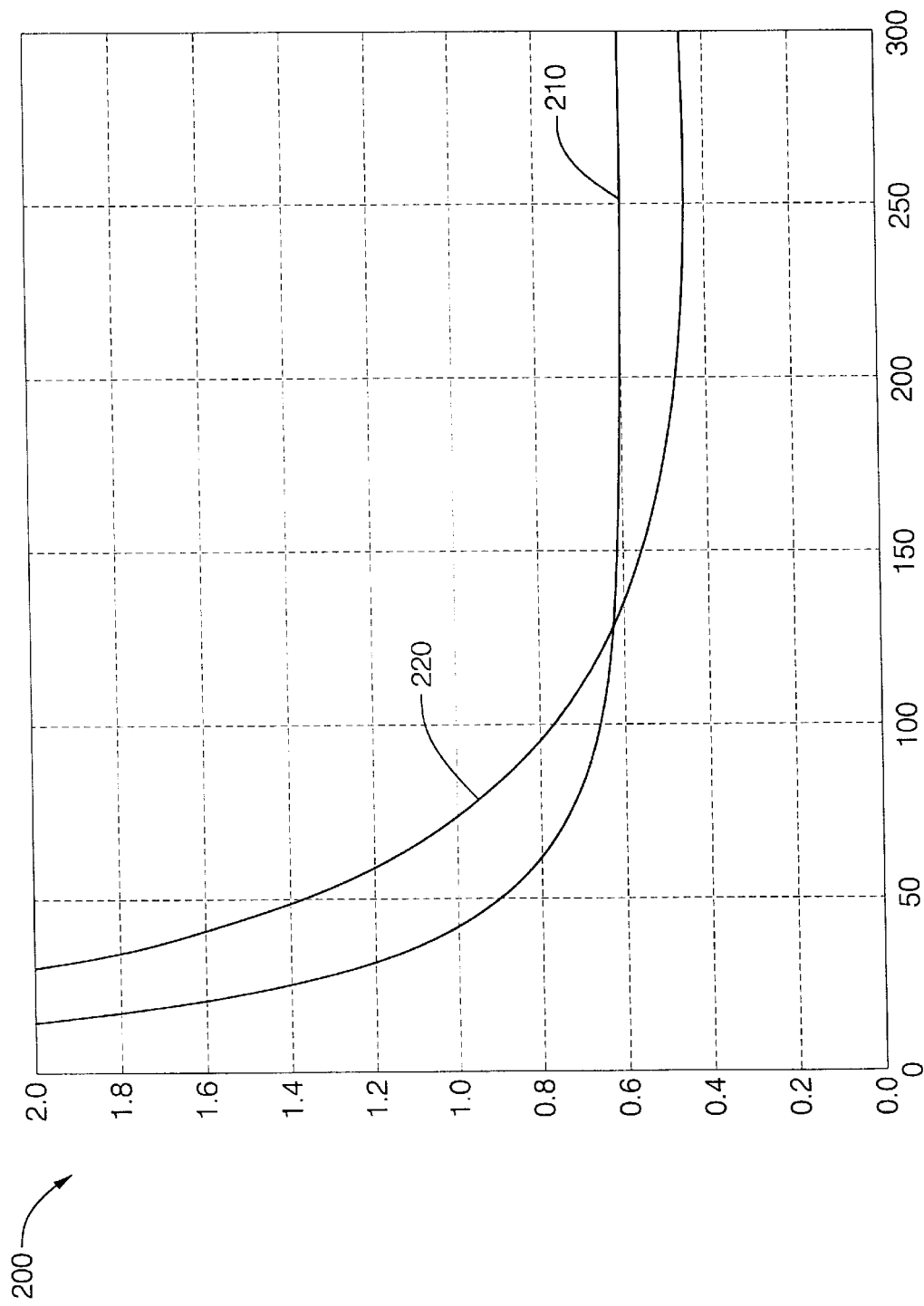
FIG. 7 shows a control input error versus time graph depicting another fault detection strategy.

An example of the effect of multiple low-pass filters and maximum function can be seen by way of graph 200 in FIG. 7, which shows two voltage-time fault lines represented by curves 210 and 220. Curve 220 corresponds to a filter-multiplier combination having a faster time constant and smaller multiplication constant than curve 210. It can be seen that by taking the maximum of the two curves, an engineer can more closely tailor the fault discrimination curve to the requirements curve.

Figure 8:
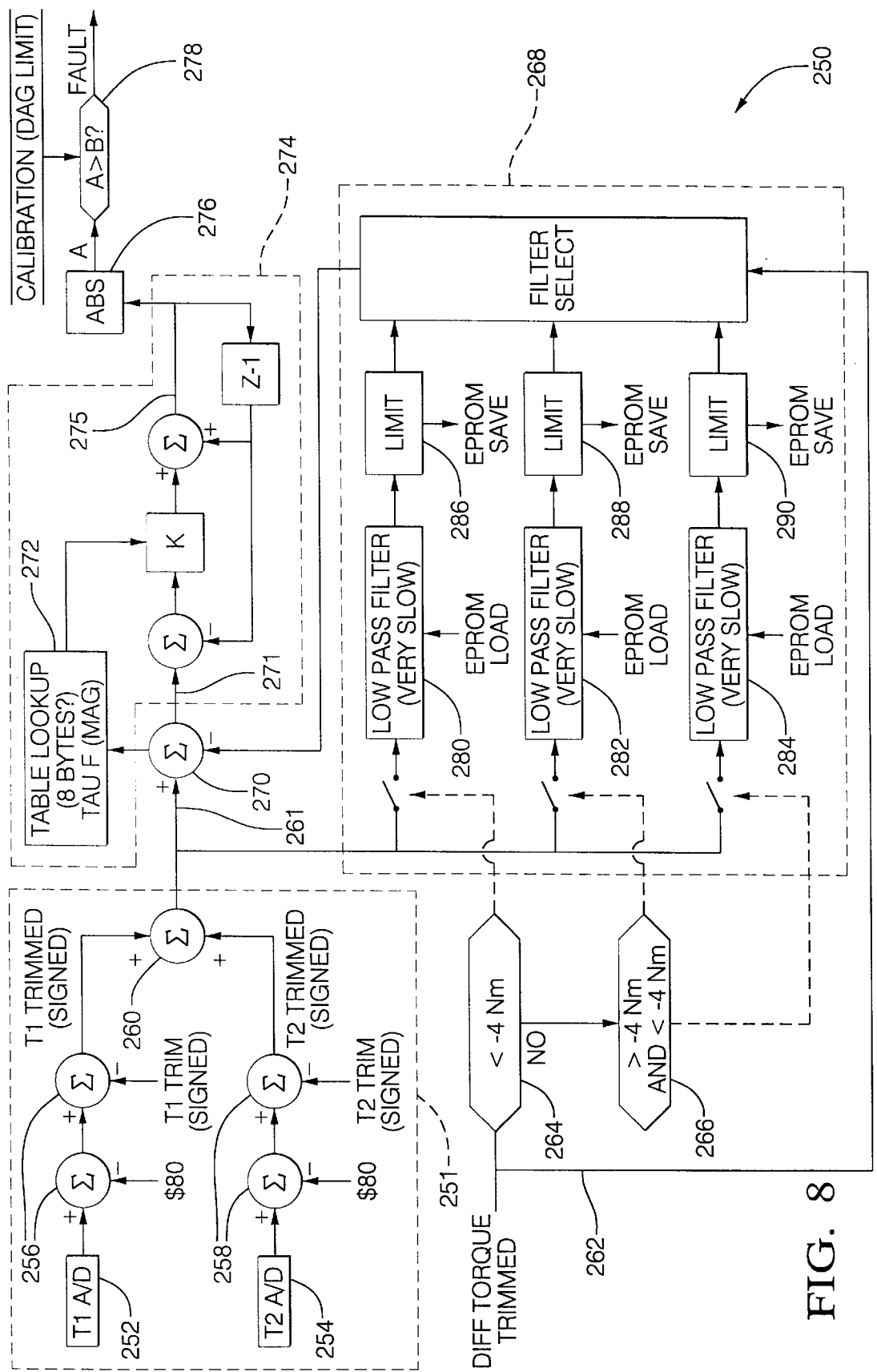
FIG. 8 shows a fault detection process diagram of a third exemplary embodiment.

Another strategy for approximating requirements curve is depicted by way of process diagram 250 in FIG. 8. In this case, a non-linear low-pass filter is applied to the torque error signal. Torque signals $T_1$ and $T_2$ are input at 252 and 254. Signal conditioner 251 includes offset and trim summers 256 and 258, and the two signals are summed at summer 260. The output of summer 260 is torque error 261. Torque error 261 is split for the purposes of filtering out signal bias errors in the incoming signals in signal bias correction procedure 268. Signal bias correction procedure 268 compensates for signal bias errors in the torque error 261 in a manner similar to that shown in FIG. 5. Because the torque signals $T_1$ and $T_2$ may exhibit non-linearities, particularly at the extremes of its range, signal bias error correction procedure 268 employs 3 low-pass filters 280, 282, and 284. Although three low-pass filters are shown, any number of low-pass filters necessary to compensate for non-linearities in the control input sensors may be used. One long-time low-pass filter 282 is used in the center portion of the range of output of $T_1$ and $T_2$. Long-time low-pass filters 280 and 284 are used at the extreme negative and positive ends of the range of output of $T_1$ and $T_2$, as will now be described in further detail.

Diff Torque Trimmed signal (DTT) 262, which is essentially $T_2-T_1$, is applied to logic boxes 264 and 266 to control the input of control input error 261 in three low-pass filters, such that if DTT 262 is less than–4 Newton-meters, torque error 261 is applied to a first long time low-pass filter 280; if DTT 262 is between –4 and 4 Newton-meters then torque error 261 is applied to a second long time low-pass filter 282. If DTT 262 is greater than 4 Newton-meters, then torque error 261 is passed to a third long time low-pass filter 284.

Each low-pass filter 280, 282, and 284 output to a limit function 286, 288, and 290, respectively, so that a fault is determined when the bias exceeds a predetermined value.

The learned value for each long time low-pass filter 280, 282, and 284 is saved in EEPROM, or other non-volatile memory, at each loop of the procedure described in process diagram 250. The output of bias error correction procedure 268 is subtracted from torque error 261 in summer 270 and results in bias-compensated torque error 271. This value is applied to non-linear low-pass filter 274 which employs a look-up table 272 to determine the adjustment to non-linear low-pass filter output 275 in the known manner. The non-linear low-pass filter output 275 is passed to absolute function 276. The output of absolute function 276 (A) is then compared with a threshold (B). If absolute function output 276 is greater than threshold B, then a fault condition is determined.

Figure 9:
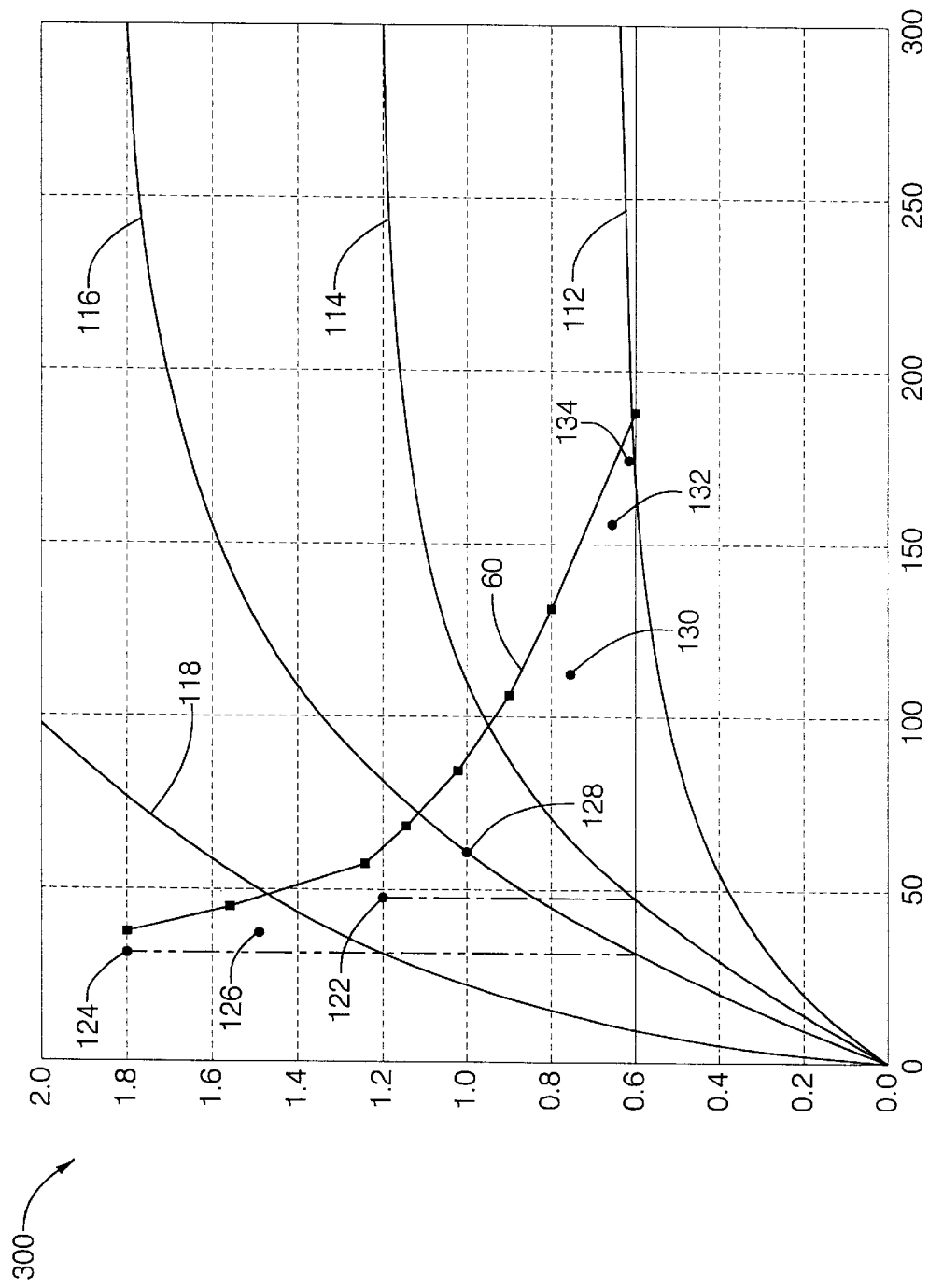
FIG. 9 shows a control input error versus time graph depicting another exemplary fault detection strategy.

FIG. 9 shows a graph 300 depicting an exemplary application of the error discrimination technique described above with reference to process diagram 250 in FIG. 8. Curves 112, 114, 116, and 118 represent outputs from non-linear low-pass filter such as described above is applied to a step function of 620 mV, 1.2 V, 1.8V, and 4 V is applied, respectively. As described above with reference to FIG. 3, points 124, 126, 122, 128, 130, 132, and 134 are plotted as the time required to generate a fault at the respective voltages applied to the non-linear filter. It can be seen that the non-linear filter technique generates a fault discrimination much closer to requirements curve 60 than the linear filter technique shown by FIG. 3.

It will be understood that the methods described above may be implemented using analog control circuitry or digitally using a digital control input sensor or an analog sensor with analog-to-digital converter and microprocessor, or a combination of analog and digital processes.

While preferred embodiments have been shown and described, various modifications and substitutions may be made thereto without departing from the spirit and scope of the invention. Accordingly, it is to be understood that the present invention has been described by way of illustration and not limitation.

What is claimed is:

1. A method for detecting a fault condition in a control system, said method comprising:

determining allowable limits of an error signal in said control system versus time;

passing the error signal through a low-pass filter;

comparing an absolute value of the output of the low-pass filter with a threshold;

outputting a fault condition when the output of the low-pass filter exceeds the threshold; and selecting a time constant of the low-pass filter and the threshold so that a fault condition is detected when the error signal approaches the allowable limits of the error signal before exceeding them.

2. The method set forth in claim 1 wherein said allowable limits of the error signal are based on steering system characteristics.

3. The method set forth in claim 2 wherein said allowable limits are determined at least in part by empirical methods.

4. The method set forth in claim 3 further comprising compensating for signal-bias by passing said error signal through a signal-bias correction routine prior to passing said error signal to said low-pass filter.

5. The method of claim 4 further comprising:

generating said error signal from a control input sensor output of a control input sensor, said error signal being a control input error signal, said compensating for signal bias includes passing said control input error signal through a first long-time low-pass filter when an output of said control input sensor is within a first range and passing said control input error signal through at least one additional long-time low-pass filter when the output of said control input sensor is within a second range to compensate for non-linearities in the output of said control input sensor.

6. The method set forth in claim 1 wherein the low-pass filter comprises a first low-pass filter, the method further comprising:

passing the error signal through a second low-pass filter and a gain multiplier in parallel with said first low-pass filter;

comparing a maximum of absolute values of outputs of the first low-pass filter and the gain multiplier with the threshold value; and selecting time constants of the first and second low-pass filters, the gain, and the threshold so that a fault condition is detected when the error signal approaches as close as possible to the allowable limits without exceeding them.

7. The method set forth in claim 1 wherein said low-pass filter is a first-order low-pass filter.

8. The method set forth in claim 1 wherein said low-pass filter is a non-linear low-pass filter.

9. The method set forth in claim 1 wherein said error signal comprises a digital value stored in digital memory and said passing, comparing, and outputting, is performed digitally using a microprocessor.

10. The method set forth in claim 1 further comprising:

generating said error signal from a control input sensor, said error signal being a control input error signal, and inputting said control input error signal into a control system including said low-pass filter.

11. The method set forth in claim 10 wherein said generating includes generating said control input error signal from control input sensor outputs of a torque sensor mounted to a steering column configured to sense the torque applied by a driver on a steering wheel.

12. A system for detecting a fault condition in an error signal comprising:

a controller passing said error signal through a low-pass filter, comparing output of the low-pass filter with a threshold, and outputting a fault condition signal when the output of the low-pass filter exceeds a threshold, wherein a time constant of the low-pass filter and the threshold are such that the fault condition is detected when the error signal approaches allowable limits before exceeding them.

13. The system set forth in claim 12 wherein said controller includes an input for said error signal, said error signal being a control input error signal.

14. The system set forth in claim 13 wherein said allowable limits of the control input error signal are based on steering system characteristics.

15. The system set forth in claim 12 wherein said allowable limits are determined at least in part by empirical methods.

16. The system set forth in claim 12 wherein the low-pass filter comprises a first low-pass filter, the controller farther:

passes the error signal through a second low-pass filter and a gain multiplier in parallel with said first low-pass filter; and compares the maximum or minimum of outputs of the first low-pass filter and the second gain multiplier with the threshold value, wherein time constants of the first and second low-pass filters, the gain, and the threshold are such that the fault condition is detected when the error signal approaches the allowable limits before exceeding them.

17. The system set forth in claim 12 wherein said low-pass filter is a linear low-pass filter.

18. The system set forth in claim 12 wherein said low-pass filter is a non-linear low-pass filter.

19. The system set forth in claim 12 wherein said controller comprises a microprocessor and said error signal comprises a digital value stored in digital memory and said passing, comparing, and outputting, is performed digitally by the microprocessor.

20. The system set forth in claim 12 further comprising:

a steering column having a control input sensor mounted to it and configured to sense the control input applied by a driver on a steering wheel, said controller generating said control input error signal from control input sensor outputs of said control input sensor.

21. The system set forth in claim 12 wherein said controller compensates for signal bias error by passing said error signal through a signal-bias correction routine prior to passing said error signal to said low-pass filter.

22. The system of claim 21 further comprising a control input sensor, said error signal being a control input error signal from said control input sensor, and said controller also compensates for non-linearities in the control input sensor output using said signal bias correction routine by passing said control input error signal through a first long-time low-pass filter when an output of said control input sensor is within a first range and passing said control input error signal through at least one additional long-time error correction routine when said output of said control input sensor is within a second range.

* * * * *